(12) United States Patent
Goto et al.

(10) Patent No.: US 9,023,510 B2
(45) Date of Patent: May 5, 2015

(54) ELECTROCHEMICAL DEVICE (75) Inventors: Kyotaro Goto, Tokyo (JP); Naoto Hagiwara, Tokyo (JP); Yuki Kawai, Tokyo (JP); Katsuei Ishida, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 313 days.

(21) Appl. No.: 13/635,288

(22) PCT Filed: Mar. 11, 2011

(86) PCT No.: PCT/JP2011/055741
§ 371 (c)(1),
(2), (4) Date: Jan. 25, 2013

(87) PCT Pub. No.: WO2011/115003
PCT Pub. Date: Sep. 22, 2011

(65) Prior Publication Data
US 2013/0143105 A1    Jun. 6, 2013

(30) Foreign Application Priority Data
Mar. 17, 2010    (JP) .................................. 2010-061180

(51) Int. Cl.
*H01M 2/02* (2006.01)
*H01G 11/22* (2013.01)
(Continued)

(52) U.S. Cl.
CPC .............. *H01M 2/0277* (2013.01); *H01G 11/08* (2013.01); *H01G 11/78* (2013.01);
(Continued)

(58) Field of Classification Search
CPC ........... H01M 6/12; H01M 4/02; H01M 2/02; H01M 2/06

USPC ......................................................... 429/162
See application file for complete search history.

(56) References Cited

U.S. PATENT DOCUMENTS 6,451,474 B1 * 9/2002 Kozu et al. .................... 429/100
6,743,546 B1 * 6/2004 Kaneda et al. ................ 429/127
(Continued)

FOREIGN PATENT DOCUMENTS

JP       2005-39256 A    2/2005
JP       2005-252003     9/2005
(Continued)

OTHER PUBLICATIONS

Written Opinion dated Jun. 7, 2011 of PCT/JP2011/055741 filed Mar. 11, 2011(3 pages).

(Continued)

*Primary Examiner* — Nicholas P D'Aniello
*Assistant Examiner* — Samuel Gillard
(74) *Attorney, Agent, or Firm* — Pillsbury Winthrop Shaw Pittman, LLP (57) ABSTRACT

[Object] To provide an electrochemical device that permits a thin package, as well as securely prevents an electrolyte or gas in an internal space from leaking outside even when temperature rise occurs in the electrochemical device during the process where the electrochemical device is reflow soldered to a circuit board or encapsulated into an IC card.

[Solution] In the electrochemical device RB1, the main body of the package PA includes first cover plate 15, first terminal plate 12, frame plate 14, second terminal plate 13, and second cover plate 16 stacked in this order and bonded at the facing surfaces. The electric storage element SD is encapsulated in internal space IS formed, between the cover plates 15, 16, by the through holes 12a1, 13a1 in the frame sections 12a, 13a of the terminal plates 12, 13 and the through hole 14a in the frame plate 14.

7 Claims, 7 Drawing Sheets

(51) Int. Cl.
  *H01G 11/08* (2013.01)
  *H01G 11/78* (2013.01)
  *H01M 2/06* (2006.01)
  *H01M 2/10* (2006.01)
  *H01M 10/04* (2006.01)
  *H01G 11/82* (2013.01)
  *H01M 2/22* (2006.01)
  *H01M 10/0525* (2010.01)
  *H01M 10/0583* (2010.01)
  *H01M 10/42* (2006.01)

(52) U.S. Cl.
  CPC ........... *H01M 2/021* (2013.01); *H01M 2/0212* (2013.01); *H01M 2/06* (2013.01); *H01M 2/1094* (2013.01); *H01M 2/22* (2013.01); *H01M 10/0436* (2013.01); *Y02E 60/13* (2013.01); *H01G 11/22* (2013.01); *H01M 10/045* (2013.01); *H01M 10/0525* (2013.01); *H01M 10/0583* (2013.01); *H01M 10/425* (2013.01); *H01G 11/82* (2013.01)

(56) References Cited

U.S. PATENT DOCUMENTS

| | | | |
|---|---|---|---|
| 7,897,280 B2* | 3/2011 | Lee et al. | 429/152 |
| 7,935,439 B2* | 5/2011 | Kim | 429/161 |
| 8,632,906 B2* | 1/2014 | Yoshihara et al. | 429/162 |
| 2001/0021474 A1* | 9/2001 | Hamada | 430/1 |
| 2004/0161665 A1* | 8/2004 | Akahira | 429/162 |
| 2005/0037258 A1 | 2/2005 | Itoh et al. | |
| 2005/0191545 A1* | 9/2005 | Bowles et al. | 429/127 |
| 2008/0118826 A1* | 5/2008 | Shimamura et al. | 429/129 |
| 2010/0143787 A1* | 6/2010 | Jung et al. | 429/162 |

FOREIGN PATENT DOCUMENTS

| | | |
|---|---|---|
| JP | 2008-135443 | 6/2008 |
| JP | 2008-135443 A | 6/2008 |

OTHER PUBLICATIONS

International Search Report of PCT/JP2011/055741 filed Mar. 11, 2011 (1 page).

\* cited by examiner

ELECTROCHEMICAL DEVICE

RELATED APPLICATIONS

This application is a U.S. National Stage application under 35 USC §371 of PCT/JP2011/055741, which claims priority under the Paris Convention to Japanese Application No. 2010-061180 filed Mar. 17, 2010, the entire contents of each of these applications being incorporated herein by reference.

TECHNICAL FIELD

The present invention relates to an electrochemical device comprising an electric storage element encapsulated in a package.

BACKGROUND

An electrochemical device, such as an electric double layer capacitor, made thinner by using a film package has been drawing attentions (see Patent Literatures 1 and 2). For the thinner electrochemical device, there is an increasing demand for: (1) reflow soldering of the electrochemical device to a circuit board; or (2) encapsulating the electrochemical device into an IC card.

This type of film package is generally fabricated of a laminate film comprising a heat resistant layer, a barrier layer, and a heat seal layer stacked in this order. Specifically, such a film package is fabricated by placing an electric storage element having terminals on a heat seal layer of the laminate film such that the tip portions of the terminals are protruded from an edge of the film; stacking another laminate film on the electric storage element such that a heat-seal layer thereof faces the electric storage element and then heating peripheries of the laminate films to integrate the heat-seal layers with each other by thermal fusion bonding. In another method of fabricating the film package, one laminate film is folded in two, instead of stacking two laminate films together.

In a typical process for reflow soldering an electrochemical device containing a film package to a circuit board, the circuit board having installed thereon the electrochemical device is placed into a reflow furnace. Therefore, temperature rise occurs to the electrochemical device in accordance with the temperature profile for the reflow soldering process, causing the temperature of the electrochemical device to rise to the peak or near-peak temperature of the reflow soldering.

In addition, in a typical process for encapsulating an electrochemical device containing a film package into an IC card, the electrochemical device is housed into a device housing unit formed on a core sheet and then a cover sheet is heat sealed to the top and bottom surfaces of the core sheet. In this process, temperature rise occurs to the electrochemical device in accordance with the temperature profile for the heat sealing, causing the temperature of the electrochemical device to rise to the peak or near-peak temperature of the heat sealing.

The heat seal layer of the laminate film used in the film package comprises a thermoplastic plastic such as polypropylene to facilitate heat sealing and to prevent temperature rise in the film package during heat sealing.

The melting point of this thermoplastic plastic is not high; therefore, in the process where the electrochemical device containing a film package is reflow soldered onto a circuit board or encapsulated into an IC card, the temperature rise causes softening or melting of "heat seal layers integrated with each other by thermal fusion bonding." Further, in this process, the internal pressure of the film package is increased by the rise in steam pressure of an electrolyte, causing the electrolyte or a gas to leak from the softened or molten portion. The leakage of the electrolyte or gas may stain the periphery or degrade the function of the electrochemical device.

In an electrochemical device containing a film package, the tip portion of the terminal is guided outside through "heat seal layers integrated with each other by thermal fusion bonding." The leakage of the electrolyte or gas tends to occur at the interface between the terminal and "heat seal layers integrated with each other by thermal fusion bonding."

RELEVANT REFERENCES

List of Relevant Patent Literature

Patent Literature 1: Japanese Patent Application Publication No. 2008-135443
Patent Literature 2: Japanese Patent Application Publication No. 2005-252003

SUMMARY

Problem Addressed by the Invention

The object of various embodiments of the present invention is to provide an electrochemical device that permits a thin package, as well as securely prevents an electrolyte or gas in an internal space from leaking outside even in case of the temperature rise in the electrochemical device during the process where the electrochemical device is reflow soldered to a circuit board or encapsulated into an IC card.

Means for Solving the Problem

An embodiment of the present invention for fulfilling the object is an electrochemical device having an electric storage element encapsulated in a package, the package comprising: (1) a first terminal plate comprising: a frame section having a through hole formed therein; and a terminal section integrated with the frame section and protruding externally from the frame section; (2) a second terminal plate comprising: a frame section having a through hole formed therein; and a terminal section integrated with the frame section, disposed at a position different from the position of the terminal section of the first terminal plate, and protruding externally from the frame section; (3) a frame plate having a through hole corresponding to the through holes of the first and second terminal plates and disposed between one surface of the frame section of the first terminal plate and one surface of the frame section of the second terminal plate; (4) a first cover plate disposed on the other surface of the frame section of the first terminal plate so as to cover the through hole of the first terminal plate; and (5) a second cover plate disposed on the other surface of the frame section of the first terminal plate so as to cover the through hole of the second terminal plate, wherein sum of thicknesses of the first and second terminal plates and the frame plate is substantially equal to thickness of the electric storage element, and the electric storage element is encapsulated in an internal space formed of the through holes of the frame sections of the first and second terminal plates and the through hole of the frame plate, between both cover plates, and part of the terminal section of the first terminal plate and part of the terminal section of the second terminal plate are exposed externally from the package.

In the electrochemical device, the package has a laminated structure comprising the first cover plate, the first terminal plate, the frame plate, the second terminal plate, and the second cover plate stacked in this order and bonded at the facing surfaces; and the electric storage element is encapsulated in the internal space formed, between the cover plates, by the through holes in the frame sections of the terminal plates and the through hole in the frame plate.

Since the internal space is formed of the through holes in the frame sections of the terminal plates and the through hole in the frame plate, the internal space in the package can be made adequate for encapsulating the electric storage element, even if the thickness of the frame plate, or the sum of the thicknesses of the first and second terminal plates and the frame plate, is reduced to be almost equal to the thickness of the electric storage element. Additionally, the first cover plate is supported by the top surface of the frame section of the first terminal plate and the top surface of the electric storage element, and the second cover plate is supported by the bottom surface of the frame section of the second terminal plate and the bottom surface of the electric storage element. Therefore, the package retains a desired rigidity even if the thicknesses of the plates are minimized. Accordingly, the thickness of the electrochemical device can be reduced to those of the conventional electrochemical devices containing a film package.

Further, since the frame sections of the terminal plates and the frame plate have no break, the electrochemical device prevents an electrolyte or a gas in the internal space from leaking outside through the frame sections or the frame plate, even if the internal pressure in the internal space increases with temperature rise. This arrangement securely prevents an electrolyte or gas in the internal space from leaking outside even in case of the temperature rise in the electrochemical device during the process where the electrochemical device is reflow soldered to a circuit board or encapsulated into an IC card.

Various embodiments of the present invention provide an electrochemical device that permits a thin package, as well as securely prevents an electrolyte or gas in an internal space from leaking outside even in case of the temperature rise in the electrochemical device during the process where the electrochemical device is reflow soldered to a circuit board or encapsulated into an IC card.

The above object of the various embodiments of the present invention, as well as other objects, features, and advantages thereof, will be apparent from the following description and the appended drawings.

DESCRIPTION OF EXAMPLE EMBODIMENTS

Embodiments of the invention are hereinafter explained in accordance with accompanying drawings. In the description, the left, right, bottom, top, near, and far parts in FIG. 1 will be referred to as the "front," "rear," "left," "right," "top," and "bottom," respectively. In other drawings, the directions corresponding to the foregoings will be referred to as "front," "rear," "left," "right," "top," and "bottom." These references to the directions are merely for convenience in accordance with the directions indicated in the drawings, and are not intended to limit the embodiments of the present invention to specific directions.

An electrochemical device RB1 according to an embodiment of the present invention will be described below with reference to FIGS. 1 to 5. The electrochemical device RB1 contains an electric storage element SD encapsulated in a package PA.

Figure 4A:
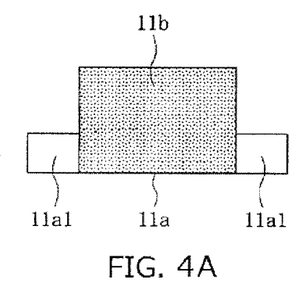
FIGS. 4A to 4C are top views of components of the electric storage element.
Figure 4B:
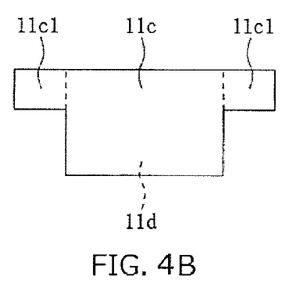
Figure 4C:
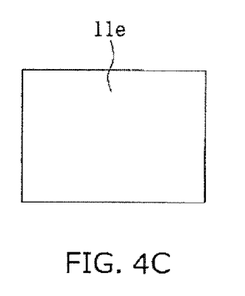

The electric storage element SD comprises a first sheet shown in FIG. 4A (not denoted by a reference sign), a second sheet shown in FIG. 4B (not denoted by a reference sign), and a separate sheet 11e shown in FIG. 4C.

As shown in FIG. 4A, the first sheet comprises: a first collecting electrode layer 11a shaped rectangularly; two rectangular tabs 11a1 disposed, integrally with the first collecting electrode layer 11a, on the left parts of both the front end and the rear end of the first collecting electrode layer 11a in a line symmetrical configuration with respect to the center line traversing, from left to right, the first collecting electrode layer 11a (corresponding to a center line CL described later); and a first polarizable electrode layer 11b shaped rectangularly, formed on the top surface of the first collecting electrode layer 11a other than the tabs 11a1.

As shown in FIG. 4B, the second sheet comprises: a second collecting electrode layer 11c shaped rectangularly; rectangular tabs 11c1 disposed, integrally with the second collecting electrode layer 11c, on the right part of both the front end and the rear end of the second collecting electrode layer 11c in a line symmetrical configuration with respect to the center line traversing, from left to right, the first collecting electrode layer 11a; and a second polarizable electrode layer 11d shaped rectangularly, formed on the bottom surface of the second collecting electrode layer 11c other than the tabs 11c1. The external dimensions of the second collecting electrode layer 11c, tabs 11c1, and second polarizable electrode layer 11d are substantially equal to those of the first collecting electrode layer 11a, tabs 11a1, and first polarizable electrode layer 11b of the first sheet. The second sheet can be obtained by inverting the same sheet as the first sheet.

As shown in FIG. 4C, the separate sheet 11e is shaped rectangularly and formed so as to have larger dimensions than the first polarizable electrode layer 11b of the first sheet and the second polarizable electrode layer 11d of the second sheet.

The first collecting electrode layer 11a and the second collecting electrode layer 11c comprise an electrically conductive materials such as aluminum or platinum and have thicknesses of, e.g., 5 to 50 µm. The first polarizable electrode layer 11b and the second polarizable electrode layer 11d comprise active materials such as polyacenic organic semiconductive (PAS) material or activated carbon, and have thicknesses of, e.g., 10 to 100 µm. The separate sheet 11e comprises an ion permeable film such as cellulosic film or plastic film and has a thickness of, e.g., 10 to 50 µm.

Figure 4D:
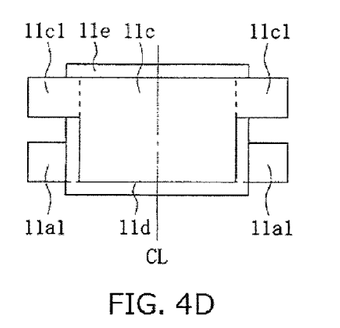
FIGS. 4D and 4E show a procedure of fabricating the electric storage element.

The electric storage element SD is fabricated as follows. First, as shown in FIG. 4D, the separate sheet 11e is stacked on the first polarizable electrode layer 11b of the first sheet such that the front, rear, left, and right edges of the separate sheet 11e protrude beyond the front, rear, left, and right edges of the first polarizable electrode layer 11b, respectively; and the second polarizable electrode layer 11d of the second sheet is stacked on the separate sheet 11e such that the front, rear, left, and right edges of the second polarizable electrode layer 11d correspond to the front, rear, left, and right edges of the first polarizable electrode layer 11b, respectively.

Figure 4E:
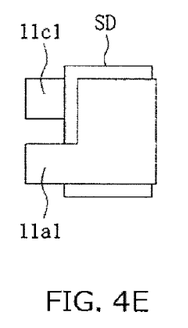

Next, as shown in FIG. 4E, the entirety of the stacked sheets is folded along the center line CL (see FIG. 4D) at the center in the front-to-rear direction to stack together the two tabs 11a1 of the first collecting electrode layer 11a and stack together the two tabs 11c1 of the second collecting electrode layer 11c.

Next, the two tabs 11a1 stacked together are partially bonded together by a welding technique such as spot welding or ultrasonic welding, and the two tabs 11c1 stacked together are partially bonded together by a welding technique such as spot welding or ultrasonic welding.

Figure 2:
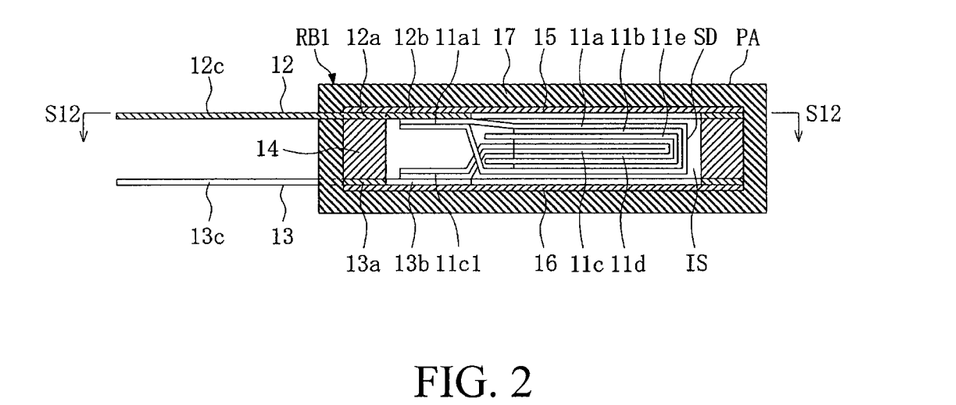
FIG. 2 is a sectional view taken along S11-S11 line in FIG. 1.

As shown in FIG. 2, the fabricated electric storage element SD has laminated structure comprising the first collecting electrode layer 11a at the outermost position, and the first polarizable electrode layer 11b, the separate sheet 11e, the second polarizable electrode layer 11d, and the second collecting electrode layer 11c inwardly arranged in this order. As shown in FIG. 2, this laminated structure includes ten layers in the top-to-bottom direction.

FIG. 2 shows, for convenience in description, the thicknesses of the layers and the thickness of the electric storage element SD (the top-to-bottom dimension) larger than the actual thicknesses. As described above, the thicknesses of the layers are so small that the actual entire thickness of the electric storage element SD is less than 1.0 mm. Because of such a thin shape, each of the layers constituting the electric storage element SD can be bent to an angle of approximately 180°. As a result, the tabs 11a1 are close to each other in the top-to-bottom direction, as are the tabs 11c1. Also, the tabs 11a1 and the tabs 11c1 are smoothly connected to the first collecting electrode layer 11a and the second collecting electrode layer 11c, respectively.

Figure 1:
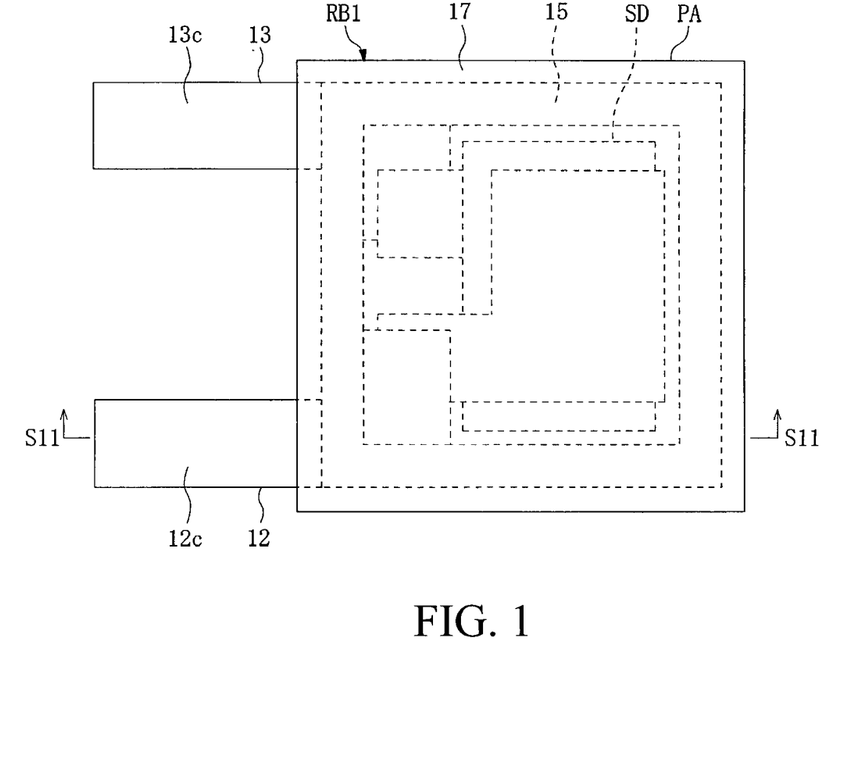
FIG. 1 is a top view of an electrochemical device according to the first embodiment of the present invention.
Figure 3:
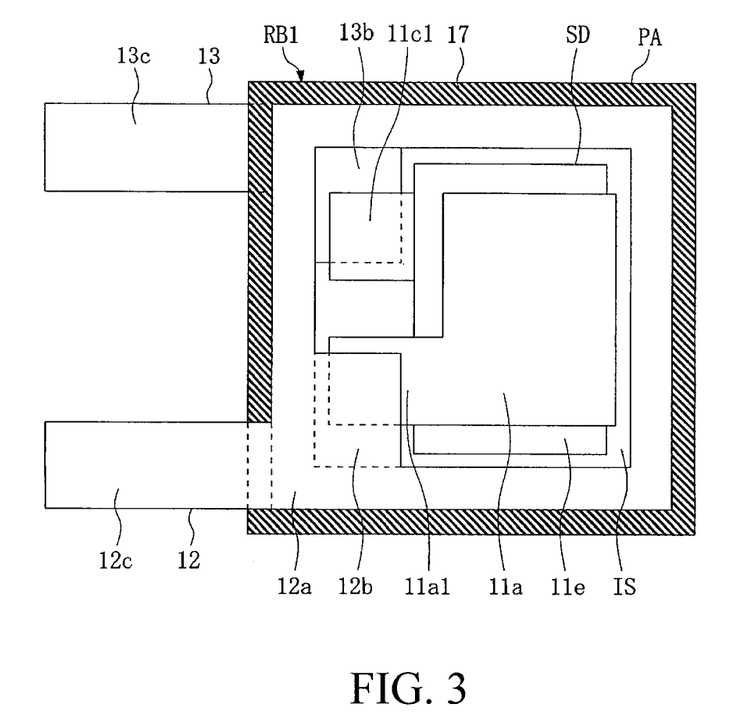
FIG. 3 is a sectional view taken along S12-S12 line in FIG. 2.
Figure 5A:
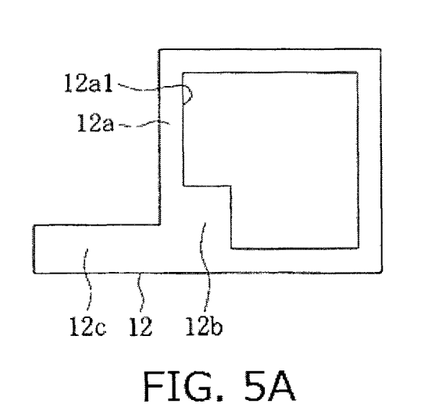
FIGS. 5A to 5E are top views of components of the package.
Figure 5B:
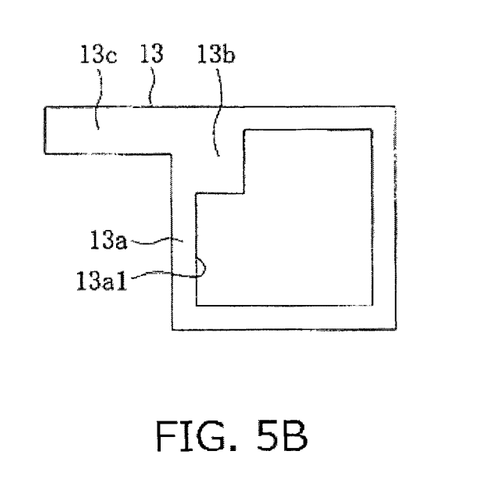
Figure 5C:
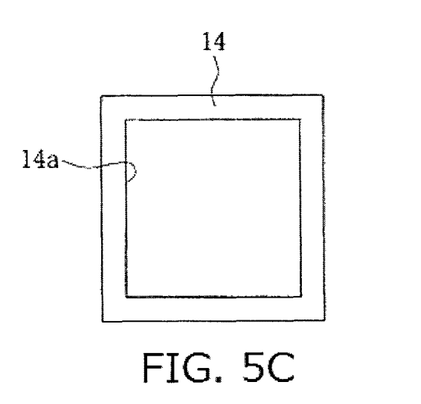
Figure 5D:
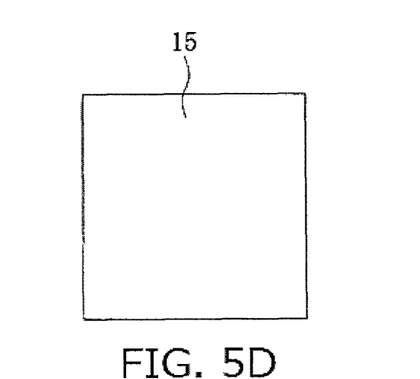
Figure 5E:
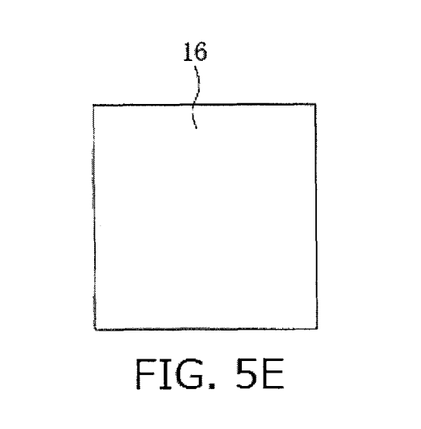

A package PA comprises a first terminal plate 12 shown in FIG. 5A, a second terminal plate 13 shown in FIG. 5B, a frame plate 14 shown in FIG. 5C, a first cover plate 15 shown in FIG. 5D, a second cover plate 16 shown in FIG. 5E, and an exterior member 17 shown in FIGS. 1 to 3.

As shown in FIG. 5A, the first terminal plate 12 comprises: a frame section 12a (not including a tab connecting section 12b and a terminal section 12c described later) shaped rectangularly and having a substantially rectangular through hole 12a1 in the middle; a tab connecting section 12b shaped rectangularly and disposed integrally with the frame section 12a inside the frame section 12a (on the left part of the front edge of the through hole 12a1); and a terminal section 12c shaped rectangularly and disposed, integrally with the frame section 12a, on the left part of the front edge of the frame section 12a, the terminal section 12c protruding externally beyond the front edge of the frame section 12a. The width of the frame section 12a in the front-to-rear direction may be the same as the width of the frame section 12a in the left-to-right direction. Also, the top surfaces of the frame section 12a, tab connecting section 12b, and terminal section 12c may be in the same plane; and the bottom surfaces thereof also may be in the same plane.

As shown in FIG. 5B, the second terminal plate 13 comprises: a frame section 13a (not including a tab connecting section 13b and a terminal section 13c described later) shaped rectangularly and having a substantially rectangular through hole 13a1 in the middle; a tab connecting section 13b shaped rectangularly and disposed integrally with the frame section 13a inside the frame section 13a (on the right part of the front edge of the through hole 13a1); and a terminal section 13c shaped rectangularly and disposed, integrally with the frame section 13a, on the right part of the front edge of the frame section 13a, the terminal section 13c protruding externally beyond the front edge of the frame section 13a. The external dimensions of the frame section 13a, tab connecting section 13b, and terminal section 13c are substantially the same as those of the frame section 12a, tab connecting section 12b, and terminal section 12c of the first terminal plate 12. The internal dimensions of the through hole 13a1 (excluding the tab 13b) are substantially the same as the dimensions of the through hole 12a1 of the first terminal plate 12 (excluding the tab 12b). The widths in the front-to-rear direction and the left-to-right direction of the frame section 13a are substantially the same as those of the frame section 12a of the first terminal plate 12. The second terminal plate 13 can be obtained by inverting the same terminal plate as the first terminal plate 12.

As shown in FIG. 5C, the frame plate 14 is shaped rectangularly with a rectangular through hole 14a defined in the middle. The external dimensions of the frame plate 14 are substantially the same as those of the frame sections 12a and 13a of the terminal plates 12 and 13. The internal dimensions of the through hole 14a are substantially the same as the dimensions of the through holes 12a1 and 13a1 of the terminal plates 12 and 13 (excluding the tabs 12b and 13b, respectively). The widths in the front-to-rear direction and the left-to-right direction of the frame plate 14 are substantially the same as those of the frame sections 12a and 13a of the terminal plates 12 and 13.

As shown in FIG. 5D, the first cover plate 15 is shaped rectangularly and has the same external dimensions as the frame sections 12a and 13a of the terminal plates 12 and 13.

As shown in FIG. 5E, the second cover plate 16 is shaped rectangularly and has the same external dimensions as the frame sections 12a and 13a of the terminal plates 12 and 13. The second cover plate 16 may be the same cover plate as the first cover plate 15.

As shown in FIGS. 2 and 3, the external member 17 forms the outer surface of the package PA and covers the entire portion between the cover plates 15 and 16. The terminal plates 12 and 13 comprise an electrically conductive material such as aluminum or platinum, and have thicknesses of, e.g., 50 to 150 µm. The frame plate 14 comprises a heat resistant insulating material such as heat resistant plastic (e.g., polyimide, polyamide-imide, or an epoxy resin) or ceramics (e.g., alumina or zirconia) preferably having a continuous-use heat resistant temperature of 150° C. or higher. The frame plate 14 has a thickness of, e.g., 100 to 700 µm. Further, the cover plates 15 and 16 comprise an electrically conductive material, such as aluminum or platinum, or the same heat resistant insulating material as the frame plate 14. The cover plates 15 and 16 have a thickness of, e.g., 50 to 150 μm. The external member 17 comprises a heat resistant insulating material such as a heat resistant plastic (e.g., polyimide, polyamide-imide, or an epoxy resin) preferably having a continuous-use heat resistant temperature of 150° C. or higher. The external member 17 has a thickness of, e.g., 100 to 500 μm.

As shown in FIG. 2, the package PA is fabricated with the first cover plate 15, the first terminal plate 12, the frame plate 14, the second terminal plate 13, and the second cover plate 16 stacked in this order and bonded together at facing surfaces.

The frame sections 12*a* and 13*a* of the terminal plates 12 and 13 respectively have the through holes 12*a*1 and 13*a*1 having substantially the same shape. The frame plate 14 disposed between the terminal plates 12 and 13 has the through hole 14*a* at a position corresponding to those of the through holes 12*a*1 and 13*a*1. Further, the first cover plate 15 covers the top surface of the frame section 12*a* of the first terminal plate 12 to block the through hole 12*a*1, and the second cover plate 16 covers the bottom surface of the frame section 13*a* of the second terminal plate 13 to block the through hole 13*a*1.

That is, the above plates are stacked together to form an internal space IS (see FIGS. 2 and 3) formed of the through holes 12*a*1, 13*a*1, and 14*a* and the cover plates 15 and 16.

In the course of the stacking process, an electric storage element SD (see FIG. 4E) is inserted into the internal space yet to be closed in the direction shown in FIG. 3, whereby the tabs 11*a*1 of the electric storage element SD and the tab connecting unit 12*b* of the first terminal plate 12 are partially bonded by a welding technique such as spot welding or ultrasonic welding; and the tabs 11*c*1 and the tab connecting unit 13*b* of the second terminal plate 13 are partially bonded by a welding technique such as spot welding or ultrasonic welding Further, in the course of the stacking process, an electrolyte (e.g., a solution of triethylmethylammonium borofluoride dissolved in propylene carbonate as a solvent, or a gel obtained by adding polyacrylonitrile to the solution) is injected into the internal space IS yet to be closed.

The above plates can be bonded together with a heat resistant adhesive, such as polyimide adhesives or polyamide-imide adhesives, preferably having a continuous-use heat resistant temperature of 150° C. or higher after curing. The above plates are bonded together with a heat resistant adhesive of which the type can be selected desirably in accordance with the substance of the plates. The interfaces between the bonded plates are readily provided with high bonding strength.

Thus, the top surface of the frame section 12*a* of the first terminal plate 12 is bonded to the periphery of the bottom surface of the first cover plate 15 with the heat resistant adhesive; and the bottom surface of the frame section 12*a* is bonded to the top surface of the frame sheet 14 with the heat resistant adhesive. Further, the top surface of the frame section 13*a* of the second terminal plate 13 is bonded to the bottom surface of the frame sheet 14 with the heat resistant adhesive; and the bottom surface of the frame section 13*a* is bonded to the periphery of the top surface of the second cover plate 16 with the heat resistant adhesive.

Next, the bonded plates are inserted into a mold (not shown) having a cavity corresponding to the outer shape of the external member 17, and a fluid material for forming the external member 17 is introduced into the cavity and cured. Alternatively, a coating technique such as application or spraying may be used to apply the fluid material for forming the external member 17 to the entire outer surface of the bonded plates for cure. These methods of forming the external member 17 are examples and do not limit the methods of forming the external member 17 in various embodiments of the present invention.

This procedure of fabricating the package PA enables the electrochemical device RB1 shown in FIGS. 1 to 3 to be configured such that the electric storage element SD is encapsulated in the package PA and the front portions of the terminal sections 12*c* and 13*c* of the terminal plates 12 and 13 are exposed externally from the front surface of the package PA. The above procedure of fabricating the package PA is a mere example. The package PA according to various embodiments of the present invention can be fabricated by various fabrication procedures obvious to those skilled in the art.

The thicknesses of the plates and the thickness of the external member 17 are so small that the actual entire thickness (the length in the top-to-bottom direction) of the package PA is less than, e.g., 2.5 mm, and is less than, e.g., 1.5 mm when the external member 17 is excluded. In an embodiment of the present invention, a frame plate 14 has substantially the same thickness as an electric storage element SD. In another embodiment of the present invention, the sum of the thicknesses of the terminal plates 12 and 13 and the thickness of the frame plate 14 is substantially the same as the thickness of the electric storage element SD. It should be noted that FIG. 2 shows, for convenience in description, the thicknesses (the top-to-bottom dimensions) of the electric storage element SD and the thickness (the top-to-bottom dimension) of the frame plate 14 larger than the actual thicknesses thereof, as stated above.

The examples of the effects of the electrochemical device RB1 according to various embodiments of the present invention are the following.

(1) In the electrochemical device RB1, the main body of the package PA has laminated structure comprising a first cover plate 15, a first terminal plate 12, a frame plate 14, a second terminal plate 13, and a second cover plate 16 stacked in this order and bonded together at the facing surfaces. The electric storage element SD is encapsulated in an internal space IS formed, between the cover plates 15 and 16, by the through holes 12*a*1 and 13*a*1 in the frame sections 12*a* and 13*a* of the terminal plates 12 and 13 and the through hole 14*a* in the frame plate 14.

That is, since the internal space IS is formed of the through holes 12*a*1 and 13*a*1 of the frame sections 12*a* and 13*a* of the terminal plates 12 and 13 and the through hole 14*a* in the frame plate 14, the internal space IS in the package PA can be made adequate for encapsulating the electric storage element SD, even if the thickness of the frame plate 14, or the sum of the thicknesses of the terminal plates 12 and 13 and the frame plate 14, is reduced to be almost equal to the thickness of the electric storage element SD. Additionally, the cover plate 15 is supported by the top surface of the frame section 12*a* of the first terminal plate 12 and the top surface of the electric storage element, and the cover plate 16 is supported by the bottom surface of the frame section 13*a* of the terminal plate 13 and the bottom surface of the electric storage element SD. Therefore, the main body of the package PA retains a desired rigidity even if the thicknesses of the plates are minimized. Accordingly, the thickness of the electrochemical device RB1 can be reduced to that of the conventional electrochemical devices containing a film package.

Further, since the frame sections 12*a* and 13*a* of the terminal plates 12 and 13 and the frame plate 14 have no break, the electrochemical device prevents an electrolyte or a gas in the internal space IS from leaking outside through the frame sections 12*a* and 13*a* or the frame plate 14, even if the internal pressure in the internal space IS increases with temperature rise. This arrangement securely prevents an electrolyte or gas in the internal space IS from leaking outside even in case of the temperature rise in the electrochemical device RB1 during the process where the electrochemical device RB1 is reflow soldered to a circuit board or encapsulated into an IC card.

(2) In the electrochemical device RB1, the plates constituting the main body of the package PA are bonded together at the facing surfaces with a heat resistant adhesive. The heat resistant adhesive can be appropriately selected in accordance with the substance of the plates from those having, after curing, a continuous-use heat resistant temperature enough to endure the above temperature rise; thus, the interfaces between the bonded plates are provided with high bonding strength. In addition, the electrochemical device RB1 prevents an electrolyte or a gas in the internal space IS from leaking outside through the interfaces, even if the internal pressure in the internal space IS increases with temperature rise.

(3) In the electrochemical device RB1, the main body of the package PA retains a desired rigidity even if the thicknesses of the plates are minimized. Therefore, the package PA is safe from deformation or damage even if an external force is exerted on an outer surface of the electrochemical device RB1 when, e.g., the electrochemical device RB1 is handled while being reflow soldered to a circuit board or being encapsulated in an IC card.

(4) In the electrochemical device RB1, the external member 17 forming the outer surface of the package PA increases the rigidity of the package PA and suppresses or delays at least slightly the temperature rise in the internal space IS of the electrochemical device RB1.

Figure 6:
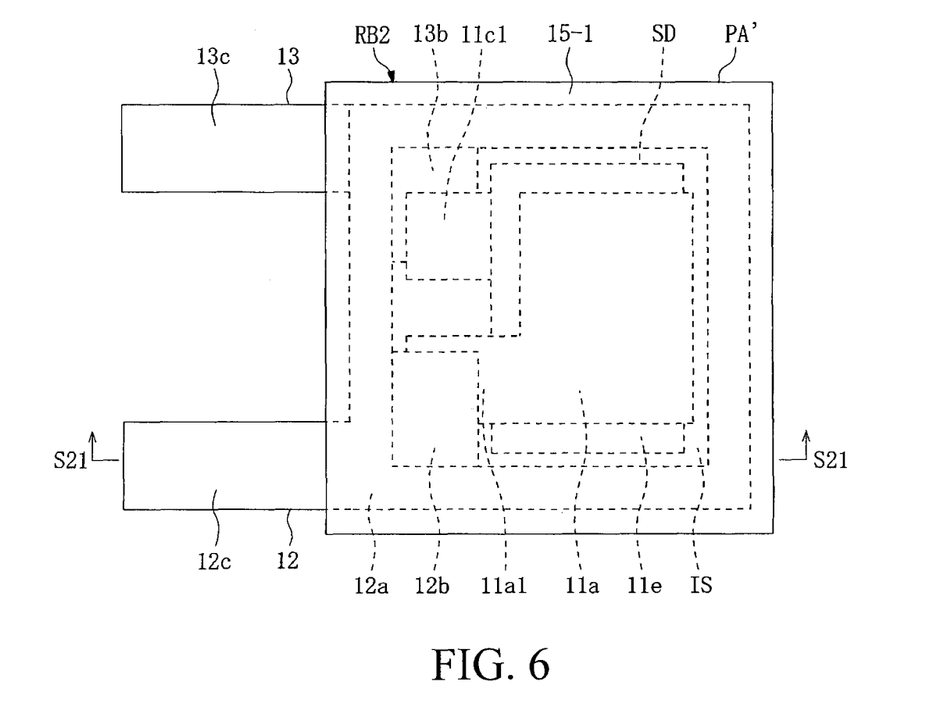
FIG. 6 is a top view of an electrochemical device according to the second embodiment of the present invention.
Figure 7:
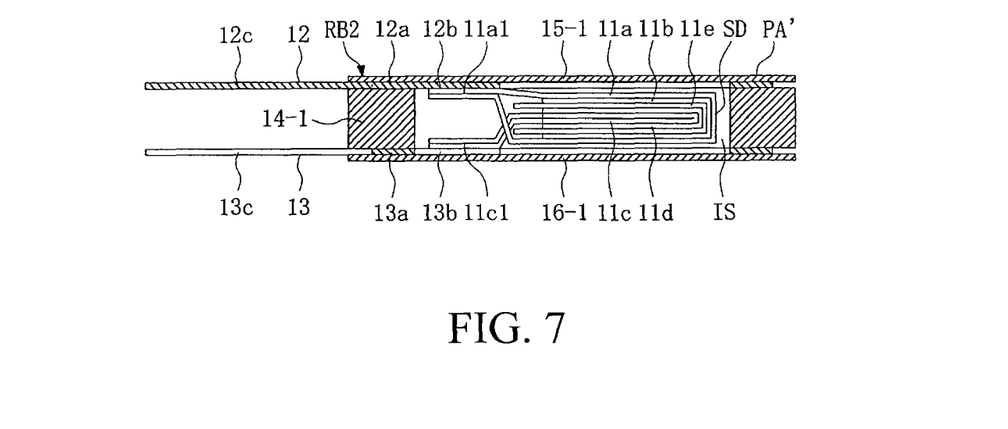
FIG. 7 is a sectional view taken along S21-S21 line in FIG. 6.

With reference to FIGS. 6 and 7, an electrochemical device RB2 according to another embodiment of the present invention will be described below. The electrochemical device RB2 differs from the electrochemical device RB1 in that the former contains a package PA' not having an external member 17.

The package PA' comprises a first terminal plate 12 shown in FIG. 5A, a second terminal plate 13 shown in FIG. 5B, a frame plate 14-1 shown in FIG. 7, a first cover plate 15-1 shown in FIG. 7 and a second cover plate 16-1 shown in FIG. 7.

As shown in FIG. 7, the frame plate 14-1 is shaped rectangularly with a rectangular through hole 14a (not denoted by a reference sign) defined in the middle. The external dimensions of the frame plate 14-1 are larger than those of the frame sections 12a and 13a of the terminal plates 12 and 13. The internal dimensions of the through hole 14a are substantially the same as the dimensions of the through holes 12a1 and 13a1 of the terminal plates 12 and 13 (excluding the tabs 12b and 13b, respectively). The widths in the front-to-rear direction and the left-to-right direction of the frame plate 14-1 are larger than those of the frame sections 12a and 13a of the first terminal plates 12 and 13.

As shown in FIG. 7, the first cover plate 15-1 is shaped rectangularly and has the same external dimensions as the frame plate 14-1.

As shown in FIG. 7, the second cover plate 16-1 is shaped rectangularly and has the same external dimensions as the frame plate 14-1. The second cover plate 16-1 may be the same cover plate as the first cover plate 15-1.

The substances and the thicknesses of the frame plate 14-1 and cover plates 15-1 and 16-1 may be substantially the same as the substances and the thicknesses of the frame plate 14 and the cover plates 15 and 16 of the first embodiment, respectively.

As shown in FIG. 7, the package PA' is fabricated with the first cover plate 15-1, the first terminal plate 12, the frame plate 14-1, the second terminal plate 13, and the second cover plate 16-1 stacked in this order and bonded together at facing surfaces. The package PA' can be fabricated in substantially the same procedure as the package PA above. For example, the procedure of fabricating the package PA' includes the steps of stacking the plates, injecting an electrolyte, and bonding together the plates with an adhesive; and these steps can be performed in the same manner as for the above embodiment.

By stacking the plates, an internal space IS (see FIG. 7) is formed of the through holes 12a1, 13a1, and 14a between the cover plates 15 and 16. Further, the external dimensions of the frame plate 14-1 and the cover plates 15-1 and 16-1 are larger than those of the frame sections 12a and 13a of the terminal plates 12 and 13; therefore, the front, rear, left, and right edges of the frame plate 14-1 and the cover plates 15-1 and 16-1 respectively protrude externally beyond the front, rear, left, and right edges of the frame sections 12a and 13a of the terminal plates 12 and 13 by the differences of the dimensions.

The electrochemical device RB2 provides the same effects as the effects (1) to (3) described above. Further, the front, rear, left, and right edges of frame sections 12a and 13a of the terminal plates 12 and 13 respectively lie inside the front, rear, left, and right edges of the frame plate 14-1 and the cover plates 15-1 and 16-1; therefore, the front, rear, left, and right edges of the frame sections 12a and 13a of the terminal plates 12-1 and 13-1 are prevented from contacting with ambient devices without providing the external member 17.

Figure 8A:
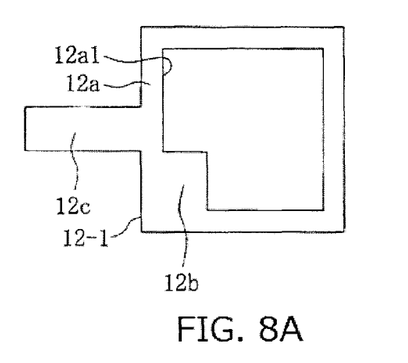
FIG. 8A is a top view of the first terminal plate included in the electrochemical device according to the third embodiment of the present invention.
Figure 8B:
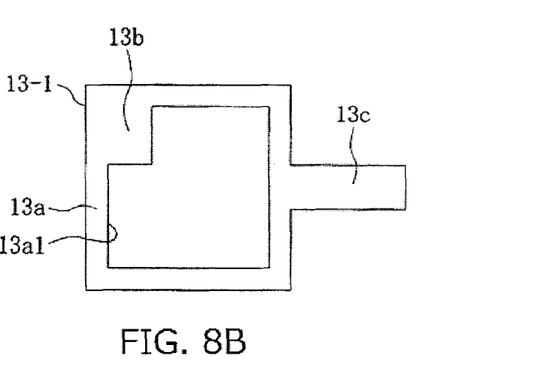
FIG. 8B is a top view of the second terminal plate in the same electrochemical device.

With reference to FIG. 8, an electrochemical device RB3 according to another embodiment of the present invention will be described below. The electrochemical device RB3 differs from the electrochemical device RB1 according to the first embodiment in that the electrochemical device RB3 is provided with a first terminal plate 12-1 shown in FIG. 8A in place of the first terminal plate 12 and is provided with a second terminal plate 13-1 shown in FIG. 8B in place of the second terminal plate 13.

As shown in FIG. 8A, the first terminal plate 12-1 comprises: a frame section 12a (not including a tab connecting section 12b and a terminal section 12c described later) shaped rectangularly and having a substantially rectangular through hole 12a1 in the middle; a tab connecting section 12b shaped rectangularly and disposed integrally with the frame section 12a inside the frame section 12a (on the left part of the front edge of the through hole 12a1); and a terminal section 12c shaped rectangularly and disposed, integrally with the frame section 12a, on the central part of the front edge of the frame section 12a, the terminal section 12c protruding externally beyond the front edge of the frame section 12a. The width of the frame section 12a in the front-to-rear direction is the same as the width of the frame section 12a in the left-to-right direction. Also, the top surfaces of the frame section 12a, tab connecting section 12b, and terminal section 12c are in the same plane; and the bottom surfaces thereof are in the same plane.

As shown in FIG. 8B, the second terminal plate 13-1 comprises: a frame section 13a (not including a tab connecting section 13b and a terminal section 13c described later) shaped rectangularly and having a substantially rectangular through hole 13a1 in the middle; a tab connecting section 13b shaped rectangularly and disposed integrally with the frame section 13a inside the frame section 13a (on the right part of the front edge of the through hole 13a1); and a terminal section 13c shaped rectangularly and disposed, integrally with the frame section 13a, on the central part of the rear edge of the frame section 13a, the terminal section 13c protruding externally beyond the rear edge of the frame section 13a. The external dimensions of the frame section 13a, tab connecting section 13b, and terminal section 13c are substantially the same as those of the frame section 12a, tab connecting section 12b, and terminal section 12c of the first terminal plate 12. The internal dimensions of the through hole 13a1 (excluding the tab 13b) are substantially the same as the internal dimensions of the through hole 12a1 of the first terminal plate 12 (excluding the tab 12b). The widths in the front-to-rear direction and the left-to-right direction of the frame section 13a are substantially the same as those of the frame section 12a of the first terminal plate 12.

The substances and the thicknesses of the terminal plates 12-1 and 13-1 may be substantially the same as the substances and the thicknesses of the terminal plates 12 and 13 of the first embodiment, respectively.

Figure 8C:
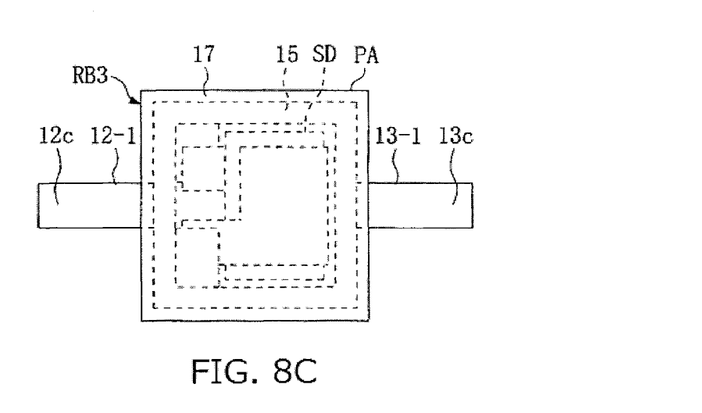
FIG. 8C is a top view of the electrochemical device fabricated with the first terminal plate shown in FIG. 8A and the second terminal plate shown in FIG. 8B.

The package PA shown in FIG. 8 can be fabricated with the terminal plates 12-1 and 13-1 in place of the terminal plates 12 and 13 in substantially the same procedure as the package PA described above. For example, the procedure of fabricating the package PA includes the steps of stacking the plates, injecting an electrolyte, and bonding together the plates with an adhesive; and these steps can be performed in the same manner as for the above embodiment. The electrochemical device RB3 shown in FIG. 8C is obtained by this procedure using the package PA. In the electrochemical device RB3, an electric storage element SD is encapsulated in the package PA, the front part of the terminal section 12c of the first terminal plate 12-1 is exposed externally from the front surface of the package PA, and the rear part of the terminal section 13c of the second terminal plate 13-1 is exposed externally from the rear surface of the package PA.

The electrochemical device RB3 provides the same effects as the effects (1) to (4) of the first embodiment described above.

Further, the electrochemical device RB3, in which the terminal sections (12c and 13c) are exposed at different positions, can be readily obtained by using the terminal plates 12-1 and 13-1 having the terminal sections (12c and 13c) at different positions. The positions where the terminal sections are exposed can be readily changed by using terminal plates having terminal sections at desired positions.

Similarly, the positions where the terminal sections are exposed can be readily changed by using the terminal plates 12-1 and 13-1 shown in FIGS. 8A and 8B or other terminal plates having the terminal sections 12c and 13c at different positions in place of the terminal plates 12 and 13 of the electrochemical device RB2 described above.

Figures 9A, 9B:
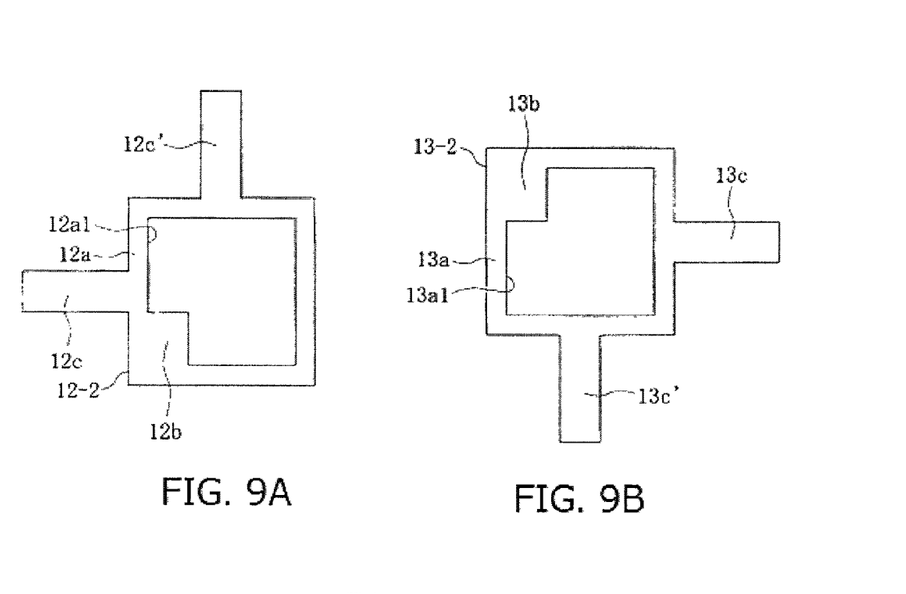
FIG. 9A is a top view of the first terminal device included in the electrochemical device according to the fourth embodiment of the present invention.
FIG. 9B is a top view of the second terminal plate of the same electrochemical device.

With reference to FIG. 9, an electrochemical device RB4 according to another embodiment of the present invention will be described below. The electrochemical device RB4 differs from the electrochemical device RB1 in that the electrochemical device RB4 is provided with a first terminal plate 12-2 shown in FIG. 9A in place of the first terminal plate 12 and is provided with a second terminal plate 13-2 shown in FIG. 9B in place of the second terminal plate 13.

As shown in FIG. 9A, the first terminal plate 12-2 comprises: a rectangular frame section 12a (not including a tab connecting section 12b and a terminal section 12c described later) shaped rectangularly and having a substantially rectangular through hole 12a1 in the middle; a tab connecting section 12b shaped rectangularly and disposed integrally with the frame section 12a inside the frame section 12a (on the left part of the front edge of the through hole 12a1); a terminal section 12c shaped rectangularly and disposed, integrally with the frame section 12a, on the central part of the front edge of the frame section 12a, the terminal section 12c protruding externally beyond the front edge of the frame section 12a; and a terminal section 12c' shaped rectangularly and disposed, integrally with the frame section 12a, on the central part of the right edge of the frame section 12a, the terminal section 12c' protruding externally beyond the right edge of the frame section 12a. The width of the frame section 12a in the front-to-rear direction is the same as the width of the frame section 12a in the left-to-right direction. Also, the top surfaces of the frame section 12a, tab connecting section 12b, and terminal sections 12c and 12c' are in the same plane; and the bottom surfaces thereof are in the same plane.

As shown in FIG. 9B, the second terminal plate 13-2 comprises: a frame section 13a (not including a tab connecting section 13b and a terminal section 13c described later) shaped rectangularly and having a substantially rectangular through hole 13a1 in the middle; a tab connecting section 13b shaped rectangularly and disposed integrally with the frame section 13a inside the frame section 13a (on the right part of the front edge of the through hole 13a1); a terminal section 13c shaped rectangularly and disposed, integrally with the frame section 13a, on the central part of the rear edge of the frame section 13a, the terminal section 13c protruding externally beyond the rear edge of the frame section 13a; and a terminal section 13c' shaped rectangularly and disposed, integrally with the frame section 13a, on the central part of the left edge of the frame section 13a, the terminal section 13c' protruding externally beyond the left edge of the frame section 13a. The external dimensions of the frame section 13a, tab connecting section 13b, and terminal sections 13c and 13c' are substantially the same as those of the frame section 12a, tab connecting section 12b, and terminal sections 12c and 12c' of the first terminal plate 12. The internal dimensions of the through hole 13a1 (excluding the tab 13b) are substantially the same as the internal dimensions of the through hole 12a1 of the first terminal plate 12 (excluding the tab 12b). The widths in the front-to-rear direction and the left-to-right direction of the frame section 13a are substantially the same as those of the frame section 12a of the first terminal plate 12.

The substances and the thicknesses of the terminal plates 12-2 and 13-2 may be substantially the same as the substances and the thicknesses of the terminal plates 12 and 13 of the first embodiment, respectively.

Figure 9C:
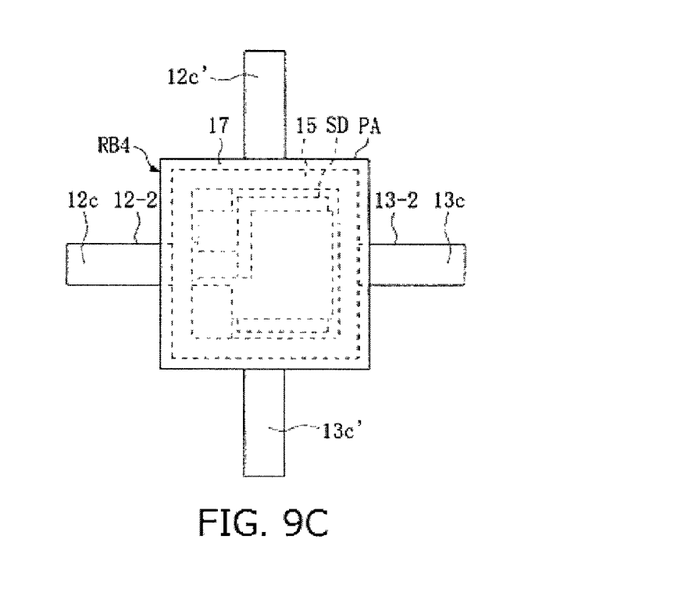
FIG. 9C is a top view of the electrochemical device fabricated with the first terminal plate shown in FIG. 9A and the second terminal plate shown in FIG. 9B.

The package PA shown in FIG. 9 is fabricated by the same procedure as the first embodiment, except that the terminal plates 12 and 13 are replaced with the terminal plates 12-2 and 13-2. This procedure of fabricating a package PA provides an electrochemical device RB4 shown in FIG. 9C, wherein the electric storage element SD is encapsulated in the package PA; the front part of the terminal section 12c of the first terminal plate 12-2 is exposed externally from the front surface of the package PA; the right part of the terminal section 12c' is exposed externally from the right surface of the package PA; the rear part of the terminal section 13c of the second terminal plate 13-2 is exposed externally from the rear surface of the package PA; and the left part of the terminal section 13c' is exposed externally from the left surface of the package PA.

The electrochemical device RB4 provides the same effects as the effects (1) to (4) of the first embodiment described above.

Further, the electrochemical device RB4, in which the number of the terminal sections (12c, 12c', 13c, and 13c') exposed are different, can be readily obtained by using the terminal plates 12-2 and 13-2 having a different number of terminal sections (12c, 12c', 13c, and 13c'). The number of the terminal sections exposed can be readily changed by using terminal plates having a desired number of terminal sections.

Similarly, the number of the terminal sections exposed can be readily changed by using the terminal plates 12-2 and 13-2 shown in FIGS. 9A and 9B or other terminal plates having a different number of terminal sections 12c and 13c in place of the terminal plates 12 and 13 of the electrochemical device RB2 described above.

The embodiments of the present invention are not limited to those explicitly described above, and various modifications are possible for the embodiments described above. For example, the electric storage element SD may be a non-folded electric storage element formed of a collecting electrode layer, a polarizable electrode layer, and a separate sheet stacked in a certain order in one direction. Further, the number of layers in the electric storage element SD can be changed as necessary regardless of whether it is a folded type or a non-folded type.

The positions of the tab connecting sections 12b provided in the first terminal plates 12, 12-1, and 12-2 and the tab connecting sections 13b provided in the second terminal plates 13, 13-1, and 13-2 can be changed as necessary in accordance with the positions of the tabs of an electric storage element (including a folded electric storage element SD and a non-folded electric storage element).

The shapes of the frame sections 12a of the first terminal plates 12, 12-1, and 12-2, the frame sections 13a of the second terminal plates 13, 13-1, and 13-2, and the frame plates 14 and 14-1 may be other than a rectangle such as a circle or an oval. In accordance with these modifications of the shapes, the shapes of the first cover plates 15 and 15-1 and the second cover plates 16 and 16-1 may be changed to other than a rectangle such as a circle or an oval.

The packages PA and PA' are fabricated with plates bonded together with a heat resistant adhesive at facing surfaces, wherein other bonding methods described below are also available.

In the packages PA and PA', the plates can be bonded by direct bonding. The first terminal plates 12, 12-1, and 12-2, the first cover plates 15 and 15-1, the second terminal plates 13, 13-1, and 13-2, and the second cover plates 16 and 16-1 are made of substances that can be directly bonded together by a direct bonding technique such as laser welding, resistance welding, or ultrasonic welding. Alternatively, the top surface region of the frame plates 14 and 14-1 facing the bottom surface of the first terminal plates 12, 12-1, and 12-2 is provided with a layer made of a substance to which the first terminal plates 12, 12-1, and 12-2 can be directly bonded by the direct bonding technique. This layer is formed in advance by a thin film forming technique such as vapor-phase growth or liquid-phase growth or a thick film forming technique such as paste application or baking. Additionally, the bottom surface region of the frame plates 14 and 14-1 facing the top surface of the second terminal plates 13, 13-1, and 13-2 is provided with a layer made of a substance to which the second terminal plates 13, 13-1, and 13-2 can be directly bonded by the direct bonding technique. This layer is formed in advance by a thin film forming technique such as vapor-phase growth or liquid-phase growth or a thick film forming technique such as paste application or baking.

The surfaces of the plates facing each other are thus directly bonded by the direct bonding technique. The packages PA and PA' can be fabricated without using a heat resistance adhesive.

In the packages PA and PA', the plates can be bonded by combined direct bonding and indirect bonding. For example, the top surface region of the frame plates 14 and 14-1 facing the bottom surface of the first terminal plate 12, 12-1, and 12-2 is provided with a layer made of a substance allowing bonding by an indirect bonding technique such as brazing. This layer is formed in advance by an ordinary thin film forming technique or a thick film forming technique. The bottom surface region of the frame plates 14 and 14-1 facing the top surface of the second terminal plates 13, 13-1, and 13-2 is provided with a layer made of a substance allowing bonding by an indirect bonding technique such as brazing. This layer is formed in advance by an ordinary thin film forming technique or the thick film forming technique. Thus, the first terminal plate 12, 12-1, or 12-2 can be bonded to the frame plate 14 or 14-1 by an indirect bonding technique; and the second terminal plates 13, 13-1, or 13-2 can be bonded to the frame plate 14 or 14-1 by an indirect bonding technique.

The first terminal plate 12, 12-1, or 12-2 indirectly bonded to the frame plate 14 or 14-1 is directly bonded to the first cover plate 15 or 15-1 by a direct bonding technique; and the second terminal plates 13, 13-1, or 13-2 indirectly bonded to the frame plate 14 or 14-1 is directly bonded to the second cover plate 16 or 16-1 by a direct bonding technique. The package PA and PA' are thereby fabricated by combined direct bonding and indirect bonding.

INDUSTRIAL APPLICABILITY

Various embodiments of the present invention may be applied to various electrochemical devices such as electric double layer capacitors, lithium ion capacitors, redox capacitors, and lithium ion batteries.

LIST OF REFERENCE SIGNS

RB1, RB2, RB3, RB4 electrochemical devices
SD electric storage element
PA, PA' packages
IR internal space
11a first collecting electrode layer
11a1 tab
11b first polarizable electrode layer
11c second collecting electrode layer
11c1 tab
11d second polarizable electrode layer
11e separate sheet
12, 12-1, 12-2 first terminal plates
12e frame section
12a1 through hole
12b tab connecting section
12c, 12c' terminal sections
13, 13-1, 13-2 second terminal plates
13a frame section
13a-1 through hole
13b tab connecting section
13c, 13c' terminal sections
14, 14-1 terminal plates
14a through hole
15, 15-1 first cover plates
16, 16-1 second cover plates
17 external member What claimed is:
1. An electrochemical device having an electric storage element encapsulated in a package, the package comprising:
(1) a first terminal plate comprising:
a frame section having a through hole formed therein; and
a terminal section integrated with the frame section and protruding externally from the frame section;

(2) a second terminal plate comprising:
a frame section having a through hole formed therein; and
a terminal section integrated with the frame section, disposed at a position different from the position of the terminal section of the first terminal plate, and protruding externally from the frame section;
(3) a frame plate having a through hole corresponding to the through holes of the first and second terminal plates and disposed between one surface of the frame section of the first terminal plate and one surface of the frame section of the second terminal plate;
(4) a first cover plate disposed on the other surface of the frame section of the first terminal plate so as to cover the through hole of the first terminal plate; and
(5) a second cover plate disposed on the other surface of the frame section of the first terminal plate so as to cover the through hole of the second terminal plate,
wherein the sum thickness of the first and second terminal plates and the frame plate accommodates the electrical storage element,
and the electric storage element is encapsulated in an internal space formed of the through holes of the frame sections of the first and second terminal plates and the through hole of the frame plate, between both cover plates,
and part of the terminal section of the first terminal plate and part of the terminal section of the second terminal plate are exposed externally from the package.

2. The electrochemical device of claim 1, further comprising an external member covering an outer surface of the package, wherein part of the terminal section of the first terminal plate and part of the terminal section of the second terminal plate are exposed externally from the external member.

3. The electrochemical device of claim 1, wherein each of the first terminal plate and the second terminal plate has a tab connecting section disposed inside the frame section and integrated with the frame section, and wherein the electric storage element has a first tab and a second tab having opposite polarities, the first tab being electrically connected to the tab connecting section of the first terminal plate, and the second tab being electrically connected to the tab connecting section of the second terminal plate.

4. The electrochemical device of claim 1, wherein the plates are bonded together at the facing surfaces with a heat resistant adhesive, the heat resistant adhesive having a continuous-use heat resistant temperature of 150° C. or higher after curing.

5. The electrochemical device of claim 2, wherein each of the first terminal plate and the second terminal plate has a tab connecting section disposed inside the frame section and integrated with the frame section, and wherein the electric storage element has a first tab and a second tab having opposite polarities, the first tab being electrically connected to the tab connecting section of the first terminal plate, and the second tab being electrically connected to the tab connecting section of the second terminal plate.

6. The electrochemical device of claim 2, wherein the plates are bonded together at the facing surfaces with a heat resistant adhesive, the heat resistant adhesive having a continuous-use heat resistant temperature of 150° C. or higher after curing.

7. The electrochemical device of claim 3, wherein the plates are bonded together at the facing surfaces with a heat resistant adhesive, the heat resistant adhesive having a continuous-use heat resistant temperature of 150° C. or higher after curing.

* * * * *